United States Patent
Dannström et al.

(10) Patent No.: US 6,926,829 B2
(45) Date of Patent: Aug. 9, 2005

(54) APPARATUS AND METHOD FOR SEPARATING FLUIDS THROUGH A MEMBRANE

(75) Inventors: Henrik Dannström, Sandefjord (NO); Olav Falk-Pedersen, Tønsberg (NO); Odd Rønning, Sandefjord (NO); Dag Birger Stuksrud, Sandefjord (NO); Marianne Søby Grønvold, Porsgrunn (NO)

(73) Assignee: Kvaerner Process Systems A.S., Lysaker (NO)

(*) Notice: Subject to any disclaimer, the term of this patent is extended or adjusted under 35 U.S.C. 154(b) by 5 days.

(21) Appl. No.: 10/220,263
(22) PCT Filed: Mar. 6, 2001
(86) PCT No.: PCT/GB01/00964
§ 371 (c)(1),
(2), (4) Date: Sep. 6, 2002
(87) PCT Pub. No.: WO01/66231
PCT Pub. Date: Sep. 13, 2001

(65) Prior Publication Data
US 2003/0075495 A1 Apr. 24, 2003

Related U.S. Application Data
(60) Provisional application No. 60/187,051, filed on Mar. 6, 2000.

(30) Foreign Application Priority Data
Jul. 3, 2000 (GB) .............................................. 0016368

(51) Int. Cl.⁷ ............................................. B01D 63/00
(52) U.S. Cl. ........................ 210/321.88; 210/321.89; 210/321.79; 210/435; 210/232
(58) Field of Search ................... 210/321.88, 321.89, 210/321.79, 435, 644, 232; 95/45–55; 96/4, 8, 10

(56) References Cited

U.S. PATENT DOCUMENTS

| 3,228,877 A | 1/1966 | Mahon ........................ 210/22 |
| 3,422,008 A | 1/1969 | McLain ....................... 210/22 |
| 4,119,408 A | 10/1978 | Matson ....................... 422/169 |

(Continued)

FOREIGN PATENT DOCUMENTS

| WO | GB 2 025 256 A | 1/1980 |
| WO | EP 0 439 877 A1 | 8/1991 |
| WO | EP 0 451 715 A1 | 10/1991 |
| WO | WO 91/15284 A1 | 10/1991 |
| WO | WO 92/20431 A1 | 11/1992 |
| WO | WO 94/01204 A1 | 1/1994 |
| WO | EP 0 509 031 B1 | 4/1994 |
| WO | DE 43 08 697 A1 | 9/1994 |
| WO | WO 95/21683 A1 | 8/1995 |
| WO | WO 95/26225 A1 | 10/1995 |
| WO | WO 97/02883 A1 | 1/1997 |
| WO | WO 98/13124 A1 | 4/1998 |
| WO | WO 98/51399 A1 | 11/1998 |
| WO | NO 312341 B1 | 8/1999 |

Primary Examiner—W. L. Walker
Assistant Examiner—K S Menon
(74) Attorney, Agent, or Firm—Bacon & Thomas, PLLC

(57) ABSTRACT

Apparatus for contacting first and second fluids at elevated pressures with a membrane such that one or more components of one of the fluids passes through the membrane into the other fluid, comprising a housing e.g. a pressure vessel (4), and a membrane module (20) housed in the pressure vessel and having a first fluid inlet (8a) and a first fluid outlet (8b) and a second fluid inlet (9a) and a second fluid outlet (9b), wherein a seal (61) extends round the membrane module and seals between an outside wall of the membrane module and an inside wall of the pressure vessel so as to separate the first fluid inlet from the first fluid outlet.

6 Claims, 2 Drawing Sheets fig. 6

U.S. PATENT DOCUMENTS

| | | | | |
|---|---|---|---|---|
| 4,147,754 A | | 4/1979 | Ward, III | 423/224 |
| 4,219,426 A | * | 8/1980 | Spekle et al. | 210/232 |
| 4,293,419 A | * | 10/1981 | Sekino et al. | 210/321.88 |
| 4,649,991 A | | 3/1987 | Neuhaus et al. | 165/159 |
| 4,929,259 A | | 5/1990 | Caskey et al. | 55/158 |
| 4,961,760 A | | 10/1990 | Caskey et al. | 35/158 |
| 5,230,796 A | | 7/1993 | Ter Meulen | 210/321.8 |
| 5,281,254 A | | 1/1994 | Birbara et al. | 95/44 |
| 5,352,361 A | | 10/1994 | Prasad et al. | 210/321.81 |
| 5,490,884 A | * | 2/1996 | Robinson et al. | 95/45 |
| 5,565,166 A | | 10/1996 | Witzko et al. | 264/565 |
| 5,591,250 A | | 1/1997 | Stern et al. | 95/51 |
| 6,103,118 A | | 8/2000 | Ter Meulen | 210/321.79 |
| 6,210,464 B1 | * | 4/2001 | Nakanishi et al. | 95/52 |

* cited by examiner

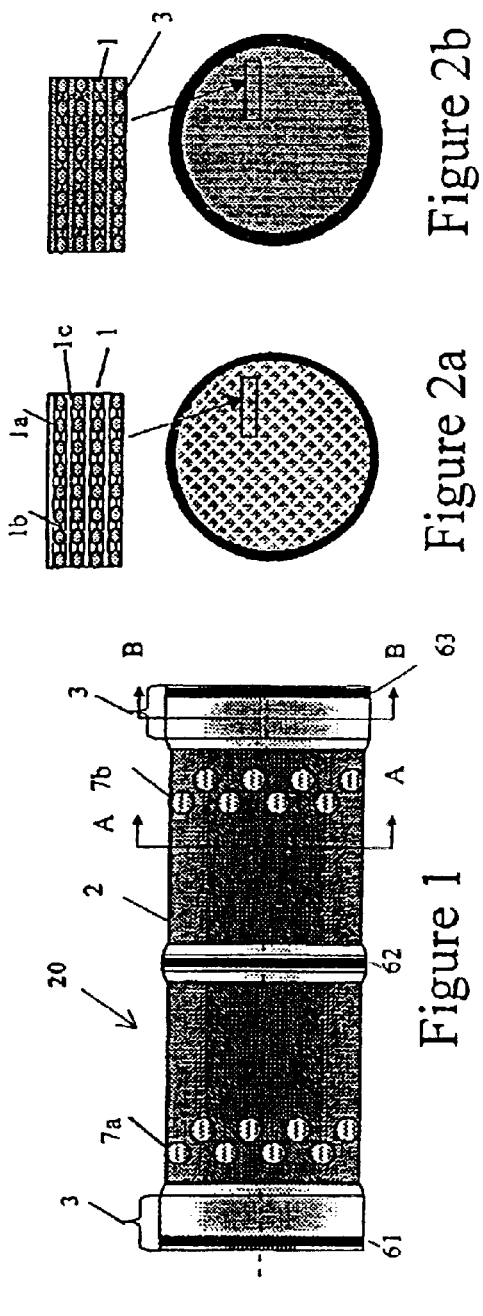
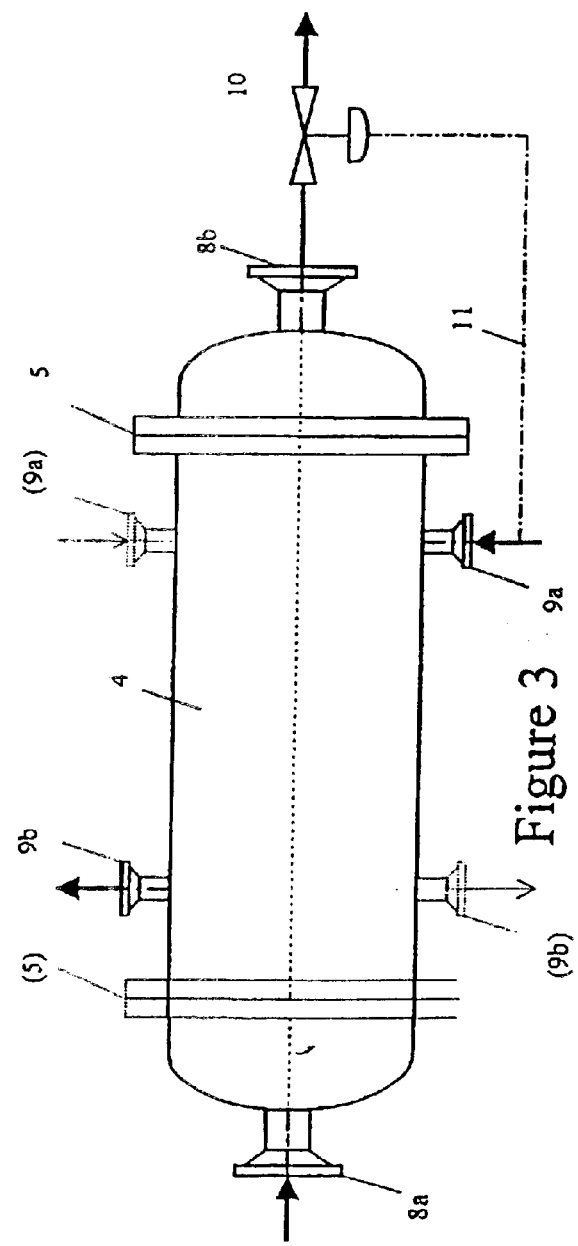

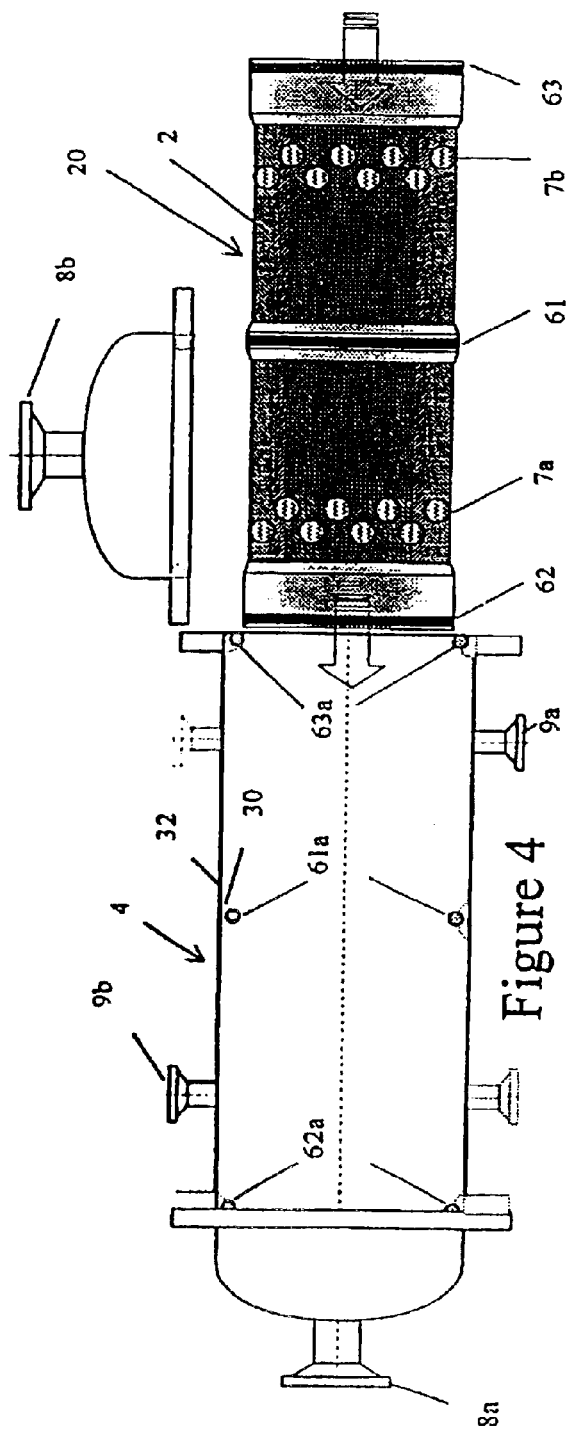
Figure 4
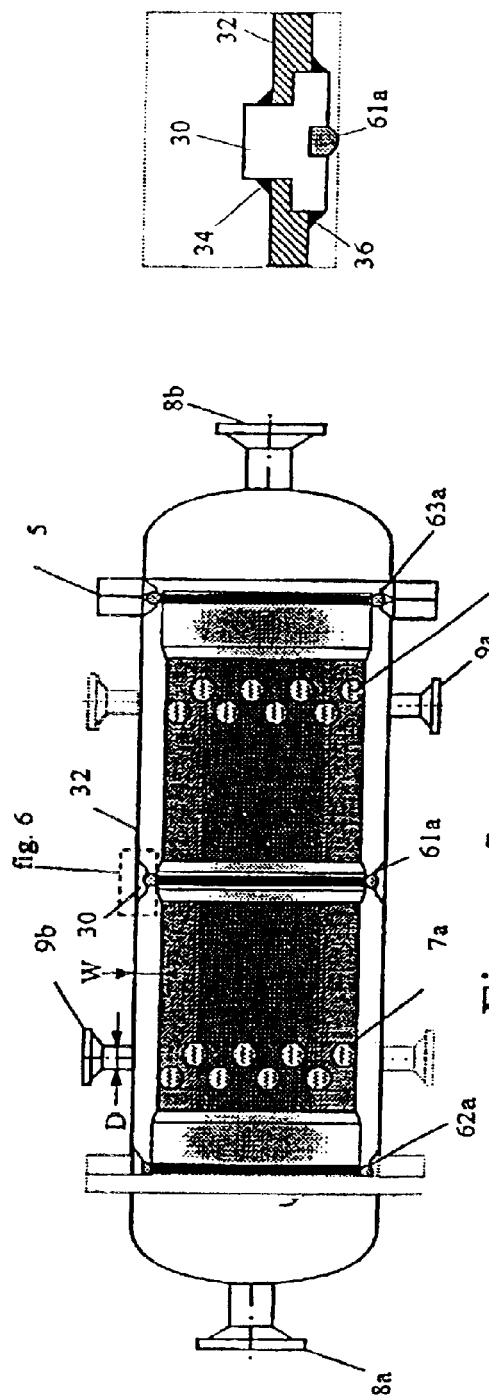
Figure 6
Figure 5

APPARATUS AND METHOD FOR SEPARATING FLUIDS THROUGH A MEMBRANE

This application is a continuation-in-part of U.S. Provisional application No. 60/187,051, filed Mar. 6, 2000.

The invention relates to apparatus and methods for separating one or more components from a fluid through a membrane, at ambient or elevated pressures, and to modules containing such a membrane. The basic principles of one type of separating process to which the present invention is applicable is described in WO 98/04339.

In modern industry, mass and heat transfer processes are among the most common processes. Mass transfer processes include contacting columns and extraction processes. In a contacting column such as an absorber or a desorber, a gas is contacted with a liquid over a high surface area, allowing the desired chemical or physical mass transfer processes to take place in a controlled manner. Afterwards the gas and the liquid are separately and usually continuously transported away from the column. Due to the intimate contact between the fluids, a parallel heat transfer also takes place in cases where the fluids have different temperatures.

Contacting devices can also simply be mixing devices with subsequent separators, which is used in for example processes involving two immiscible liquids. These processes include liquid/liquid extraction.

Conventional equipment does however have certain limitations and drawbacks. These include the limited gas to liquid ratios in columns, requirements as to orientation and in most cases also the fact that entrainment of one of the fluids in to the other often takes place, causing nuisance in downstream equipment and/or loss of product. For liquid/liquid extraction processes, the degree of immiscibility is crucial.

Membrane contactors provide means of carrying out the processes mentioned above without these disadvantages. In a membrane contactor, two (or more) fluids are exposed to each other through a membrane. The membrane has the property to restrain one or more components of each fluid, while allowing a relatively higher proportion of selected components to pass through the membrane. The membrane may also instead of being selective in itself only provide such surface properties that for example components in liquid form are not able to pass, but components in gaseous form can. An example of such a membrane is a (human) lung, where blood is not able to pass through the lung "membrane", but oxygen, water and $CO_2$ are readily transported through driven by the partial pressure difference of these on the two sides of the lung.

For industrial applications the membrane provides a physical barrier between the two fluids, thus eliminating problems related to mixing of the fluids. The transport of a fluid is constrained to either side of the membrane, thus allowing full flexibility in terms of turndown (from zero to full flow) without affecting the other side of the membrane. This also allows the orientation of the unit to be arbitrary and independent of gravity.

The membrane used in each process is selected to have the properties that are best suited for that particular application.

In high pressure processes, the membrane contactor has to be housed in a pressure vessel designed for the purpose. The requirements to functionality, strength and corrosion resistance at elevated pressure and temperature have to be met. A reliable and suitable means of doing this is therefore required.

It is known from U.S. Pat. No. 5,916,647 and EP 941758 to provide pressure vessels made of polyolefin and containing a bundle of hollow fibre membrane contactors. The bundle has a hollow centre via which shell side fluid flows into and out of the bundle, and the hollow fibre ends are potted to provide for tube side fluid flow into and out of the bundle. The pressure vessel is provided at each end with inlet and outlet pipes disposed centrally so as to mate in the hollow centre of the bundle in a manner sealed from the tube side outlet and inlet. The assembly of the bundle into the pressure vessel is therefore not simple. Moreover, the need for a hollow centre in this type of membrane configuration reduces the amount of active membrane area per unit volume.

From U.S. Pat. No. 5,264,171 it is known to provide apparatus comprising a housing which receives a bundle of hollow fibre membrane contactors with a type of inlet/outlet configuration different from that described above. FIG. 1 of U.S. Pat. No. 5,264,171 shows a housing with a fluid inlet port and a fluid outlet port at opposite axial ends for tube side flow, and a fluid inlet port and a fluid outlet port for shell side flow which are disposed axially inwardly of the axially opposite ends at the sides of the housing. An impermeable wrapping means covers the exterior cylindrical surface of the bundle of hollow fibre membrane contactors. An opening is provided in the impermeable wrapping means to communicate with the side inlet port of the housing, and a corresponding opening is provided to communicate with the side outlet port of the housing. The edges of the impermeable wrapping means surrounding the openings are sealed to the housing side inlet and outlet ports respectively, to prevent leakage from the shell side space.

It is therefore necessary in this arrangement to fit the bundle into the housing in such a way that the openings in the impermeable wrapping means register with the housing side inlet and outlet ports, with the edges of the openings properly sealing with the ports. This tends to make the assembly of the apparatus difficult, with a risk of unreliable sealing of the shell side space in the region of the housing side inlet and outlet ports, for example if exact rotational alignment about the longitudinal axis between the bundle and the housing is not achieved.

Viewed from a first aspect the invention provides apparatus for contacting first and second fluids at elevated pressures with a membrane such that one or more components of one of the fluids passes through the membrane into the other fluid, comprising a housing, and a membrane module housed in the housing and having a first fluid inlet and a first fluid outlet and a second fluid inlet and a second fluid outlet, wherein a seal extends round the membrane module and seals between an outside wall of the membrane module and an inside wall of the housing so as to separate the first fluid inlet from the first fluid outlet.

With such an arrangement, the assembly of the membrane module into the housing can be relatively straightforward, in that exact registration of the first fluid inlet and outlet with respective inlet and outlet ports of the housing is not critical. This may also enable the membrane module to be used in a conventional housing. For example, the membrane module may be used in a conventional pressure vessel without having to specially design the pressure vessel. The membrane module may be retrofitted to an existing housing, e.g. pressure vessel.

Various types of membrane may be used in the membrane module, for example paste extruded membrane tubes or spirally wound membranes. Preferably, a plurality of membrane tubes are provided. In a preferred embodiment, the membrane module comprises a plurality of membrane layers, each membrane layer comprising a plurality of membrane tubes arranged side by side with connecting portions connecting laterally adjacent membrane tubes, and the membrane layers being stacked in alternation with spacers. Such an arrangement can achieve a very effective mass transfer across the membranes. The membrane layers are preferably as described in U.S. Pat. No. 6,010,560.

It will be appreciated that the word "tube" used herein in relation to the membrane is not intended to be limiting as to the diameter size of the tube and should therefore be understood to cover various diameters of tube, including tubes in the form of fibres.

The seal extending round the membrane module is preferably positioned at an intermediate location along the membrane module, spaced from axial ends thereof.

Preferably, a pair of second seals each extend round the membrane module and seal between the outside wall of the membrane module and the inside wall of the housing, the second seals being axially spaced from the first-mentioned seal and on opposite axial sides thereof. Such second seals can in effect define isolated inlet and outlet regions, namely an inlet region between the first seal and one of the second seals and an outlet region between the first seal and the other of the second seals.

Appropriate sealing arrangements may be provided for the second fluid inlet and outlet. It is however preferred and advantageous for the second seals additionally to serve to separate the first fluid inlet or outlet from the second fluid inlet or outlet.

The housing may be a pressure vessel or pipe spool or other form of housing. In a preferred embodiment, the housing has respective inlet and outlet ports cooperating with the fluid inlets and outlets of the membrane module. In a particularly preferred arrangement: a first fluid inlet port of the housing is arranged to supply the first fluid to the first fluid inlet, which is provided in the outside wall of the membrane module; a first fluid outlet port of the housing is arranged to receive the first fluid from the first fluid outlet, which is provided in the outside wall of the membrane module; a second fluid port of the housing is arranged to supply the second fluid to the second fluid inlet of the membrane module, which is provided at an axial end of the membrane module; and a second fluid outlet port of the housing is arranged to receive the second fluid from the second fluid outlet of the membrane module, which is provided at the opposite axial end of the membrane module. Preferably, the first inlet and outlet ports for the first fluid are disposed axially inwardly of opposite axial ends of the housing, preferably being laterally directed, and the second inlet and outlet ports for the second fluid are provided at the axially opposite ends of the housing, preferably being axially directed.

The housing may have more than one first fluid inlet port and more than one first fluid outlet port. For example, the housing may have a pair of diametrically opposed first fluid inlet ports and a pair of diametrically opposed first fluid outlet ports.

In the case where a plurality of membrane tubes are used, it is preferred for the first fluid to flow on the shell side of the tubes and for the second fluid to flow on the tube side. Thus, in the preferred arrangement discussed above, the first inlet and outlet ports of the housing, and the corresponding first inlet and first outlet of the membrane module, are provided for shell side flow; whilst the second inlet and outlet ports of the housing, and the corresponding second inlet and second outlet of the membrane module, are provided for tube side flow.

It will be appreciated that by arranging a second seal axially between an end port and a lateral port of the housing, these ports may be sealingly separated from each other. Thus, the first seal and the pair of second seals can advantageously isolate the four housing ports from each other by sealing between the outside wall of the membrane module and the inside wall of the housing. Four inlet and outlet regions can effectively be defined at the point when the membrane module is inserted, e.g. axially, into the housing.

It is desirable to use the available space in the housing and thus optimise the performance of the apparatus relative to its size. Preferably, therefore, the membrane module has a cross-sectional shape corresponding substantially to that of the housing so as to fit closely therein.

The membrane module is most conveniently assembled into the housing in the axial direction. The housing may therefore have at least one full diameter flanged opening for insertion of the membrane module. In some circumstances, such as for slender membrane modules, both ends may have a full diameter flange. Flanges do however add to the cost and weight of the housing and alternatively therefore an end cap may be welded to the housing to close an end thereof, after insertion of the membrane module. If necessary, such a welded end cap can be burned off if the membrane module needs to be changed after a period of service.

It is preferred for the first-mentioned seal to be placed in the housing before insertion of the membrane module into the housing. This is because the seal is ideally located and retained by a groove and in general it is easier to provide a groove in the housing than in the membrane module. Preferably, therefore, the seal is received in a groove in the housing. It is particularly preferred to provide the groove in a separate member which is secured to a main body of the housing, e.g. by welding. This avoid having to form a groove directly in the main body, the inside of which, particularly in the case of a long slender housing, may be difficult to access.

The separate member may be secured inside a single main body of the housing. However, if welding is used, the welding stresses may cause distortion and prevent proper sealing. This problem can be solved by providing the housing with two body portions to each of which the separate member is secured to form a connection between the body portions. The separate member may then be of greater external diameter than the body portions thereby providing a strengthening flange which is not significantly distorted during the securing process.

The second seals may also be placed in the housing before insertion of the membrane module. However, in the case of a long slender module proper axial alignment can be difficult to control. Hence, the second seals may preferably be placed after insertion of the membrane module into the housing, before closing off the housing with end caps, with or without flanges.

Plow of one of the fluids may be at an angle, such as a right angle, to the membrane surface (this would be shell side flow in the case of conventional membrane tubes or hollow fibres). Such crossflow is commonly used in membrane separating processes. Preferably, however, a first fluid flow path is defined along one surface of the membrane and a second fluid flow path is defined along an opposite surface of the membrane, wherein the direction of flow of the first and second fluids along their respective paths is substantially parallel to said surfaces of the membrane. The first and second fluid flows are ideally in directions opposite to each other. These arrangements have been found to work particularly well in the preferred embodiments of the invention.

The membrane module preferably has at least one lateral opening in its outside wall to form the first fluid inlet and at least one lateral opening in its outside wall to form the first fluid outlet. It may be preferred to arrange for the lateral opening(s) to be positioned on the side of the pressure vessel remote from the inlet/outlet port thereof, in order to obtain a more even flow into the membrane module and avoid excessive flow velocities. In such circumstances, a degree of rotational alignment will be necessary but it may not have to be exact.

Preferably, however an even flow into the membrane module without excessive flow velocities is obtained by arranging the first fluid inlet to permit flow of the first liquid laterally into the membrane module substantially around its entire periphery. This arrangement is considered to be of independent patentable significance, as discussed further below.

In known systems, multiple membrane tubes are arranged in an axially extending bundle with their ends potted so that the fluid for tube side flow can be directed into the axial end of the bundle and the fluid for shell side flow can be directed into the sides of the bundle inwardly of the axial ends. Efforts have been made in the art to optimize the efficiency of fluid to membrane contact but the known systems still suffer from a lack of use of the maximum available membrane surface area. In particular, shortcomings in the design of the inlet and outlet arrangements for shell side flow often mean that there are membrane portions in dead spaces where little or no shell side flow takes place. For example, in the case of U.S. Pat. No. 5,264,171 mentioned above, the external housing of the membrane contactor apparatus has a single fluid inlet port which feeds into a single opening in the impermeable wrapping means in sealed registration with that port, with the result that the membranes on the side of the housing opposite the port may be in dead space as far as shell side flow is concerned.

The known systems are therefore not as efficient as they could be, in that not all of the membrane surface area is providing contact between the tube and shell side fluid flows. We have invented an inlet arrangement for a membrane bundle which improves the shell side flow in the inlet region and therefore maximises the use of the available membrane surface area.

Viewed from another aspect, therefore, the invention provides membrane contactor apparatus comprising a bundle of axially extending membrane tubes arranged for a first fluid to flow outside of said tubes and for a second fluid to flow axially inside said tubes from an axial end of the bundle to an opposite axial end thereof, such that one or more components of one of the fluids passes through walls of the membrane tubes into the other fluid, the apparatus further comprising inlet means disposed axially inwardly of one of said axial ends of the bundle for introducing said first fluid into the bundle, wherein the inlet means extends peripherally round the bundle and is arranged to permit flow of said first fluid laterally into the bundle substantially around its entire periphery.

This arrangement can reduce dead spaces and maximise the axial length of membrane tubes available for fluid contacting. Moreover, it is generally desirable for the bundle to be provided in a mechanically rigid form, particularly where it is to be inserted in a housing. Thus the bundle may be provided as part of a membrane module, as discussed above, having an outside wall. By arranging the first fluid inlet means to extend peripherally round the bundle, it is possible to avoid the use of a single large opening in the outside wall which would result in a non-symmetrical load bearing capacity and potential adverse bending during installation of the bundle or even leakage past the seals caused by distortion.

The inlet means may comprise one continuous inlet opening in the periphery of the bundle. However this may not always be practical from a mechanical integrity point of view and there may be intervals between plural openings in the periphery of the bundle. Preferably, the inlet means comprises a plurality of circumferentially spaced inlet openings in the periphery of the bundle. The periphery of the bundle may be defined by an impermeable outside wall around the bundle, such as the outside wall of a membrane module.

In a preferred embodiment, the membrane tubes are arranged in a plurality of layers extending laterally across the bundle, for example of the type shown in U.S. Pat. No. 6,010,560. Flow within the bundle is generally easier parallel to the layers than passing from one layer to another (although this is usually allowed for by suitable holes in the layers and spacers if provided). Advantageously, therefore, the inlet openings are arranged in the periphery of the bundle so that each membrane layer is exposed to at least one of the inlet openings.

If the circumferential spacing between adjacent lateral openings in the outside wall is too small, this can undesirably weaken the mechanical integrity of the wall. It is therefore advantageous to provide at least two rows of circumferentially spaced inlet openings in the periphery of the bundle, with the centres of inlet openings in adjacent rows being circumferentially offset. With such an arrangement, every membrane layer can be-exposed to a respective inlet opening whilst an adequate circumferential spacing between the openings in the same row is provided for mechanical strength.

In the case of a membrane layer, it is possible to expose the layer to a respective inlet opening at only one side of the layer. This means that a membrane layer exposed on one side need not be exposed on the other side, so that the circumferential spacing between adjacent inlet openings in the periphery of the bundle on that other side may be greater, allowing mechanical rigidity and strength to be retained. Thus, in this arrangement, some of the membrane layers are exposed to a respective inlet opening at only one side of the respective layer.

As discussed above in relation to the first aspect of the invention, the bundle may be housed in a housing having an inlet port for the first fluid. In such an arrangement, one way of providing for flow laterally into the bundle substantially around its entire periphery is to provide an inlet chamber arranged to receive the first fluid from the inlet port and extending round the periphery of the bundle. In the case of the preferred bundle of circular cross-sectional shape, the inlet chamber will be annular.

In order to avoid a high pressure drop and mechanical forces on the bundle, the first fluid flow speed should decrease from the inlet port to the periphery of the bundle. This can be achieved across the width of the inlet chamber, providing the width is greater than a certain size. Preferably, the width of the inlet chamber, measured between an inside wall of the housing and the periphery of the bundle, is greater than or equal to one quarter of the width of the inlet port.

It will be appreciated that the features described above in relation to the inlet means of the bundle are generally applicable also to appropriate outlet means of the bundle. Thus the apparatus may comprise outlet means disposed axially inwardly of the axial end of the bundle remote from the inlet means, the outlet means extending peripherally round the bundle and being arranged to permit flow of the first fluid laterally out of the bundle substantially around its entire periphery. The outlet means may comprise a plurality of circumferentially spaced outlet openings in the periphery of the bundle, and/or an outlet chamber extending round the periphery of the bundle, the outlet openings and the outlet chamber being analogous respectively to the inlet openings and the inlet chamber.

The invention also extends to a membrane module for use in apparatus as described herein and to mass transfer processes using such apparatus.

Certain preferred embodiments of the invention will now be described by way of example and with reference to the accompanying drawings, in which:

FIG. 1 is a side view of a membrane module;

FIG. 2a is a cross-section on lines A—A of FIG. 1;

FIG. 2b is a cross-section on lines B—B of FIG. 1;

FIG. 3 is a side view of a housing in the form of a pressure vessel for containing the membrane module;

FIG. 4 shows the pressure vessel in an open condition for insertion of the membrane module;

FIG. 5 is a side view of the pressure vessel showing the membrane module contained within;

FIG. 6 is a view, to an enlarged scale, of part of a modified housing.

The membrane module 20 comprises a bundle 1 of membrane tubes contained in a canister 2 made of a plastics composite material or metal. The bundle 1 consists of several layers, each membrane layer comprising a plurality of membrane tubes 1a arranged side by side with connecting portions 1b connecting laterally adjacent membrane tubes, the membrane layers being stacked in alternation with spacers 1c. The membrane layers are of the type shown in U.S. Pat. No. 6,010,560. As seen in FIG. 2, the layers are arranged such that substantially the entire cross section of the tubular canister 2 is occupied.

The membrane tubes are potted at the opposite ends of the canister by potting 3. A thermosetting polymeric material is used as matrix material in between the individual membrane tubes. In addition to ensuring that inlet/outlet flow may only pass through the membrane tubes, i.e. tube side flow, the potting ensures adhesion, load bearing and mechanical stability to the membrane bundle. Axially inwardly of the potted ends, but adjacent thereto, the canister is provided with a set of openings 7a, 7b for inlet and outlet flow on the membrane shell side. Each set of openings 7a, 7b comprises a pair of longitudinally spaced rows, the openings in each row being circumferentially spaced from each adjacent opening. As shown, the centres of the openings in one row are circumferentially offset from those in the other row. Thus, the openings of the pair of rows are arranged so that every membrane layer is exposed to at least one opening.

Three annular seal surfaces 61, 62 and 63 are provided around the outside of the canister 2. A first annular seal surface 61 is disposed at a position axially intermediate of the canister ends, the other two annular seal surfaces 62, 63 being axially spaced from the first annular seal surface 61 towards the respective canister ends.

FIG. 3 shows a pressure vessel 4. At one end this has a full size flange opening 5, enabling easy insertion of the membrane module 20 as shown in FIG. 4. In a modification, a flange opening 5 is provided at both ends and an additional flange opening 5 is therefore shown in dotted lines. At its axial ends the pressure vessel has an inlet port 8a and an outlet port 8b. Axially inwardly of the ends, but adjacent thereto, the pressure vessel has a sideways facing inlet port 9a and a sideways facing outlet port 9b. In a further modification, a pair of inlet ports 9a and a pair of outlet ports 9b are provided and these are shown in dotted lines. Each port of a pair is diametrically opposite the other port of the pair. The ports 8a, 8b are provided for tube side flow, whilst the ports 9a, 9b are provided for shell side flow.

A back pressure regulator 10 is provided downstream of the outlet port 8b and is arranged to receive a reference signal 11 indicative of the pressure at inlet port 9a. The back pressure regulator 10 is arranged to ensure that the differential pressure across the membranes does not exceed a predetermined amount, thereby ensuring that the membranes are not damaged in use.

FIG. 4 shows three annular seals 61a, 62a and 63a provided inside the pressure vessel for sealing engagement respectively with the three annular seal surfaces 61, 62 and 63. At the flanged opening 5, each flange has a bevelled edge so as to form a V-shaped groove when the end cap closes the pressure vessel 4. The seal 63a is installed after the membrane module 20 has been inserted into the pressure vessel 4. When the flanges are tightened together, the end seal 63a is compressed.

Intermediate seal 61a is supported in an annular groove formed in a separate member in the form of a ring 30 welded inside the pressure vessel to the inside of its cylindrical wall 32. In the modification shown in FIG. 6 the pressure vessel is formed as two body portions to each of which a ring 30 incorporating a radial outer flange is secured to form a connection between the body portions. The ring is welded to the body portions by outer welds 34 and inner welds 36. The ring 30 shown in FIG. 6 also has an annular groove for supporting seal 61a.

End seal 62a is, like intermediate seal 61a, supported in an annular groove in a separate member where no flanged opening is provided at that end. Both seals 61a and 62a are sufficiently flexible to give little resistance during installation of the membrane module into the pressure vessel. If an additional flanged opening is provided at the end where seal 62a is located, then the arrangement will be the same as provided for end seal 63a.

FIG. 5 shows the membrane module 20 contained in the pressure vessel 4. It will be seen that once the membrane module is inserted in the pressure vessel, the annular seals 61a, 62a, 63a ensure the separation of the pressure vessel inlet and outlet ports as required. The three annular seals effectively create four isolated inlet and outlet regions within the pressure vessel. Between seal 61a and seal 62a an annular outlet chamber communicates with the pressure vessel outlet port 9b. Between the seal 61a and the seal 63a an annular inlet chamber communicates with the pressure vessel inlet port 9a. Inlet port 8a is located to the left of seal 62a and this seal ensures that inlet 8a is separated from outlet 9b. Outlet 8b is disposed to the right of seal 63a and this seal ensures that outlet 8b is separated from inlet 9a.

The provision of the three annular seals in this way means that there is no need for any particular rotational alignment of the membrane module and the pressure vessel in embodiments such as that illustrated where openings 7a, 7b are provided at equal intervals around the entire membrane module circumference.

The width of the annular inlet and outlet chambers is shown as W and the diameter of the inlet and outlet ports 9a, 9b is shown as D. The width W is preferably greater than or equal to one quarter of the diameter D, in order to allow for the desired reduction in flow velocity downstream of the inlet port 9a and increase in flow velocity upstream of the outlet port 9b.

With larger values of W, the flow velocities into or out of the membrane module are reduced, thereby reducing the likelihood of membrane damage. On the other hand, by minimising W, the diameter of the membrane module 20 can be maximised for a given diameter of pressure vessel 4, and hence greater use of available space can be achieved. These conflicting requirements can be balanced if W is equal to one quarter of D, in which case the flow area of the port is equal to the cross-sectional area of the respective annular chamber. This produces good flow conditions, without excessive flow velocities which might damage the membranes, whilst making efficient use of the available space in the pressure vessel. More preferably, therefore, W is approximately equal to one quarter of D, for example within ±20% of one quarter of D. Where additional inlet and outlet ports 9a, 9b are used, as shown in dotted lines in FIG. 4, then the diameter D of the ports can be reduced and the required width W of the annular chambers can be reduced by the same ratio.

The canister does not need to be designed for the same pressure as the pressure vessel, only to withstand the differential pressure equal to the pressure drop between the tube and the shell side of the membranes at any point. A larger pressure variation, which may harm the membranes or the module, is prevented by the membrane protection system, 10,11, which is external of the pressure vessel. Additional reinforcement of the canister may however be necessary in the region of the seals for these regions to achieve sufficient back pressure on the seals, so that the seals can function properly.

The canister is substantially rigid to facilitate its assembly into the pressure vessel. It may be made of metal or fibre reinforced plastics. In the latter case, the canister may be made by filament winding. The winding may be effected with rods in the mandrel to achieve the desired openings without reducing the mechanical strength of the canister.

The flange opening 5 allows for both easy installation and retraction of the canister as shown in FIG. 3. Retraction of the canister can preferably be done with two textile straps glued into the potting or wound into the canister tube if composite material is selected. For more slender canisters or a narrow annulus, where it might be more complicated to assemble the canister into the pressure vessel, both ends may have a full diameter flange.

The seals in the annulus around the membrane module help to achieve the correct flow pattern. The seals at each end, 62a and 63a, of the module prevent mixing of tube side fluid and shell side fluid in the vessel. The mid section seal 61a prevents an undesirable shortcut of the shell side fluid. In both cases the pressure difference over the seals will not be higher than the pressure drop along the module plus any additional contribution from the surrounding process system. These seals should preferably be made of an inert material and according to a design suitable for the purpose, and will in a preferred case be simple O-rings or more compressible spring loaded lip seals. Where some axial movement, due to thermal expansion are foreseen square profiles such as provided by James Walker might be used. A "D" profile, which is stable against twisting, may be used.

The seal 61a at the mid section of the annulus may be an inflatable seal type to ease the assembly. Such a seal can allow a wider gap and will be inflated after assembly. Such seals are available from Seal Master Corporation or Mechanical Research & Design Inc. Inflatable seals are of greatest use at ambient or low pressure applications, it not being generally practical to pressurise a seal to a pressure greater than natural gas pressure.

The membrane module should have a shell side feed arranged in such a way that an even distribution of shell side fluid can be ensured so as to protect the membranes from harmful inlet flow, such as high velocity flows which might cause cavitation. This can be prevented by adding a reducer after the feed port, e.g. nozzle, or a bigger annulus in this section of the pressure vessel. A preferred solution is to use a baffle inside the pressure vessel or to place the inlet opening(s) of the canister on the opposite side of the pressure vessel inlet port.

The canister tube should preferably have multiple openings 7a, 7b arranged to secure an even distribution of the flow into the membranes or it could have one elliptical slot. The optimised design will be different for each particular case. The openings should be located axially as close to the membrane potting as possible, in order to allow for a counter current flow over a maximum axial length through the membrane module.

The tube side inlet and outlet of the membrane module are provided at the potted ends thereof which communicate with the inlet and outlet ports 8a, 8b of the pressure vessel. Shell side inlet and outlet ports 9a, 9b of the pressure vessel are arranged such that they communicate with the corresponding openings 7a, 7b, when the module is installed in the pressure vessel. The shell side feed could also be through multiple nozzle connections, or through a ring chamber if further improved distribution on the shell side is required.

The total area of the ports should be such that the fluid velocity on entrance into the membrane bundle, preferably does not exceed 500 mm/s for a liquid and 5000 mm/s for a gas, or creates a too high pressure drop.

There are many mass transfer processes in which the present invention may be applied, as is known in the art. The invention is particularly suitable for removing carbon dioxide, hydrogen sulphide and water from natural gas, but this is just one possible use.

Although the use of a pressure vessel renders the apparatus suitable for mass transfer processes at elevated pressures, the apparatus can also be used at ambient pressures. Typical elevated pressures at which the apparatus is useful are those in excess of 10 bar g ($10^6$ N/m$^2$ above atmospheric pressure).

What is claimed is:

1. Membrane contactor apparatus comprising a bundle of axially extending membrane tubes arranged for a first fluid to flow outside of said tubes and for a second fluid to flow axially inside said tubes from an axial end of the bundle to an opposite axial end thereof, such that one or more components of one of the fluids passes through walls of the membrane tubes into the other fluid, the apparatus further comprising inlet means disposed axially inwardly of one of said axial ends of the bundle for introducing said first fluid into the bundle, wherein the inlet means comprises a plurality of circumferentially spaced inlet openings in the periphery of the bundle and is arranged to permit flow of said first fluid laterally into the bundle substantially around its entire periphery, wherein the membrane tubes are arranged in a plurality of layers extending laterally across the bundle, and wherein each membrane layer is exposed to at least one of said inlet openings.

2. Membrane contactor apparatus comprising a bundle of axially extending membrane tubes arranged for a first fluid to flow outside of said tubes and for a second fluid to flow axially inside said tubes from an axial end of the bundle to an opposite axial end thereof, such that one or more components of one of the fluids passes through walls of the membrane tubes into the other fluid, the apparatus further comprising inlet means disposed axially inwardly of one of said axial ends of the bundle for introducing said first fluid into the bundle, wherein the inlet means comprises a plurality of circumferentially spaced inlet openings in the periphery of the bundle and is arranged to permit flow of said first fluid laterally into the bundle substantially around its entire periphery, and wherein at least two rows of circumferentially spaced inlet openings are provided in the periphery of the bundle, with the centres of inlet openings in adjacent rows being circumferentially offset.

3. Apparatus as claimed in claim 1, wherein the bundle is housed in a housing having an inlet port for the first fluid, and wherein an inlet chamber is arranged to receive the first fluid from the inlet port and extends round the periphery of the bundle.

4. Apparatus as claimed in claim 3, wherein the width of the inlet chamber, measured between an inside wall of the housing and the periphery of the bundle, is greater than or equal to one quarter of the width of the inlet port.

5. Apparatus as claimed in claim 1, wherein the first fluid is arranged to flow outside of said membrane tubes in the axial direction.

6. Apparatus as claimed in claim 5, wherein the first and second fluid flows are in axial directions opposite to each other.

* * * * *